United States Patent

Heil et al.

[11] Patent Number: 5,359,715
[45] Date of Patent: Oct. 25, 1994

[54] ARCHITECTURES FOR COMPUTER SYSTEMS HAVING MULTIPLE PROCESSORS, MULTIPLE SYSTEM BUSES AND MULTIPLE I/O BUSES INTERFACED VIA MULTIPLE PORTED INTERFACES

[75] Inventors: Thomas F. Heil; Craig A. Walrath, both of Easley; Jimmy D. Pike, Columbia; Edward A. McDonald, Lexington; Arthur F. Cochcroft, Jr., West Columbia; P. Chris Raeuber, Central; Daniel C. Robbins, Easley; Gene F. Young, Lexington, all of S.C.

[73] Assignee: NCR Corporation, Dayton, Ohio

[21] Appl. No.: 760,786

[22] Filed: Sep. 16, 1991

[51] Int. Cl.⁵ .............................................. G06F 13/00
[52] U.S. Cl. ................................... 395/325; 395/200; 364/DIG. 1; 364/258.2; 364/240.2; 364/244; 364/241.9
[58] Field of Search ................... 395/325, 800, 200

[56] References Cited

U.S. PATENT DOCUMENTS

| | | | |
|---|---|---|---|
| 4,041,472 | 8/1977 | Shah et al. ............... | 364/DIG. 2 |
| 4,263,649 | 4/1981 | Lapp, Jr. ................ | 364/DIG. 1 |
| 4,604,683 | 8/1986 | Russ et al. ............. | 364/DIG. 1 |
| 4,652,993 | 3/1987 | Scheuneman et al. ..... | 364/DIG. 1 |
| 4,652,994 | 3/1987 | Hattori et al. .......... | 364/DIG. 1 |
| 4,797,815 | 1/1989 | Moore .................... | 364/200 |
| 4,805,106 | 2/1989 | Pfeifer .................. | 364/200 |
| 4,807,109 | 2/1989 | Farrell et al. .......... | 364/200 |
| 4,858,116 | 8/1989 | Gillett, Jr. et al. .... | 364/200 |
| 4,864,496 | 9/1989 | Triolo et al. .......... | 364/200 |
| 4,868,742 | 9/1989 | Gant et al. ............ | 364/200 |
| 4,912,630 | 3/1990 | Cochcroft, Jr. ........ | 364/200 |
| 4,920,486 | 4/1990 | Nielsen ................. | 364/200 |
| 4,949,239 | 8/1990 | Gillett, Jr. et al. .... | 364/200 |
| 4,953,074 | 8/1990 | Kametani et al. ....... | 364/132 |
| 4,961,140 | 10/1990 | Pechanek et al. ...... | 364/200 |
| 5,001,625 | 3/1991 | Thomas et al. ........ | 364/200 |
| 5,006,981 | 4/1991 | Beltz et al. ........... | 364/200 |
| 5,006,982 | 4/1991 | Ebersole et al. ....... | 364/200 |
| 5,019,962 | 5/1991 | Funabashi et al. ..... | 364/DIG. 1 |
| 5,060,145 | 10/1991 | Scheuneman et al. .. | 364/DIG. 1 |
| 5,081,576 | 1/1992 | Ward .................... | 395/325 |
| 5,093,780 | 3/1992 | Sunahara ............... | 395/800 |
| 5,138,703 | 8/1992 | Igarashi ................ | 395/325 |

FOREIGN PATENT DOCUMENTS

0290172 11/1988 European Pat. Off. .
0366361 5/1990 European Pat. Off. .
8301135 3/1983 PCT Int'l Appl. .

*Primary Examiner*—Eddie P. Chan
*Attorney, Agent, or Firm*—Richard C. Stevens

[57] ABSTRACT

Multiple processor systems are configured to include at least two system or memory buses with at least two processors coupled to each of the system buses, and at least two I/O buses which are coupled to the system buses to provide multiple expansion slots hosting up to a corresponding number of I/O bus agents for the systems at the cost of a single system bus load for each I/O bus. Each of the system and I/O buses are independently arbitrated to define decoupled bus systems for the multiple processor systems of the present invention. Main memory for the systems is made up of at least two memory interleaves, each of which can be simultaneously accessed through the system buses. Each of the I/O buses are interfaced to the system buses by an I/O interface circuit which buffers data written to and read from the main memory or memory interleaves by I/O bus agents.

14 Claims, 8 Drawing Sheets

FIG. 11

ARCHITECTURES FOR COMPUTER SYSTEMS HAVING MULTIPLE PROCESSORS, MULTIPLE SYSTEM BUSES AND MULTIPLE I/O BUSES INTERFACED VIA MULTIPLE PORTED INTERFACES

BACKGROUND OF THE INVENTION

The present invention relates generally to computer systems and, more particularly, to methods and apparatus for structuring multiple processor computer systems to provide for the interconnection of multiple processors to multiple system buses and to multiple I/O subsystem buses. The I/O subsystem buses are interfaced to the system buses for buffering data to be written to or read from the memory by agents resident on the I/O subsystem buses, and all system buses and I/O subsystem buses are independently arbitrated to define a decoupled bus system for the multiple processor computer systems.

Computer systems have traditionally included a central processing unit or CPU, data storage devices including a main memory which is used by the CPU for performance of its operations and a system bus which interconnects the CPU to the main memory and any other data storage devices. In addition, I/O devices are connected to the system via the bus. The bus thus serves as a communications link among the various devices making up a system by carrying clock and other command signals and data signals among the devices.

As processors and memory devices evolve, computer systems are being operated at higher and higher speeds to transmit more and more data and command signals in less time over a system bus. To alleviate some of the communications burdens, computer systems which include multiple buses have been developed. For example, a high speed bus may be provided to interconnect a processor to associated high speed memory and a slower speed I/O bus to interconnect to slower input/output devices. Multiple bus computer systems can carry higher volumes of data and control signals; however, multiple bus computer systems create their own control challenges in terms of control of the multiple buses.

To attain still higher speeds, multiple processor systems have also been developed. Of course the number of control and data signals required for operation of multiple processor systems are greater than those required for single processor systems. It is apparent that the complexity of communications among units within a computer system is further increased by multiple processor systems. The complexity of communications within multiple processor systems is still further increased when such systems incorporate multiple buses.

While the use of conventional techniques, such as organizing and programming multiple processor systems to minimize interactions among the processors, can improve the operations of existing computer system architectures, there is a continuing need for new and improved computer system architectures to advance the art and to provide better operating computer systems. Such an improved system architecture would preferably be scalable to provide a wide variety of system configurations for a correspondingly wide variety of applications. In this way, a computer system could be configured for a given application and expanded and contracted in accordance with development of the application within limits of the preliminary configuration.

SUMMARY OF THE INVENTION

This need is met by the methods and apparatus of the present invention wherein multiple processor systems are configured to include at least two system or memory buses with at least two processors coupled to each of the system buses, and at least one I/O bus and preferably two or more I/O buses which are coupled to the system buses to provide multiple expansion slots hosting up to a corresponding number of I/O bus agents for the systems at the cost of a single system bus load per I/O bus. Each of the system and I/O buses are independently arbitrated to define decoupled bus systems for the multiple processor systems of the present invention. Main memory for the systems preferably comprises at least two memory interleaves each of which can be simultaneously accessed through the system buses. Each I/O bus is interfaced to the system buses by an I/O interface circuit which buffers data written to and read from the main memory or memory interleaves by I/O bus agents. By buffering main memory read/write data, the I/O interface circuit can supply data from main memory as fast as an agent on the I/O bus can receive it and can receive data written to the main memory as rapidly as an agent on an I/O bus can supply it.

In accordance with one aspect of the present invention, a multiple processor architecture comprises at least two system buses with at least two processors coupled to each of the system buses. At least two memory interleaves are coupled to the system buses, each memory interleave having at least two ports for performing the system bus coupling. At least two I/O buses are provided for coupling agents resident on the I/O buses to one another, to the processors, and to the memory interleaves. At least two I/O bus interface means couple the I/O buses to the system buses. Control of the system buses and the I/O buses is independently arbitrated, and the I/O bus interface means each comprise buffering means for latching data to be written from the agents to the memory interleaves and for read-ahead prefetching data to be read by the agents from the two memory interleaves. In accordance with the broadest apparatus aspects of the present invention, at least one I/O bus can be provided for coupling agents resident thereon to one another, to the processors, and to the memory interleaves.

The buffering means each comprise at least one buffer register sized to receive one line of data with the line of data corresponding in size to the size of a data line of the two memory interleaves. The I/O bus interface means each include control means for selectively prefetching from one line of data up to the number of lines of data which correspond to the number of buffer registers included within an I/O bus interface means. Preferably, the buffering means each comprise at least two buffer registers sized to receive one line of data with the line of data corresponding in size to the size of a data line of the two memory interleaves. With this structure, one buffer register can be packed by an agent while another buffer register can be emptied by writing data packed therein to the two memory interleaves.

In accordance with another aspect of the present invention, a multiple processor architecture comprises at least two system buses with at least two processors coupled to each of the system buses. At least two memory interleaves are provided with each memory interleave having a number of ports corresponding to the number of system buses for coupling the memory interleaves to the system buses. At least two I/O buses are provided for coupling agents resident on the I/O buses to one another. At least two I/O bus interface means having a number of ports corresponding to the number of system buses couple the I/O buses to the system buses. The agents are coupled to the processors and to the memory interleaves via the I/O buses, the I/O interface means and the system buses. The system buses and the I/O buses each comprise arbitration means for independently arbitrating control of the system buses and the I/O buses, and each of the I/O bus interface means comprise buffering means for latching data to be written from the agents to the memory interleaves and for read-ahead prefetching data to be read by the agents from the memory interleaves.

The buffering means each comprise at least one buffer register sized to receive one line of data from the memory interleaves. The at least two I/O bus interface means include control means for selectively prefetching from one line of data up to the number of lines of data corresponding to the number of buffer registers included within an I/O bus interface means. Preferably, the buffering means each comprise at least two buffer registers sized to receive one line of data from the memory interleaves such that one buffer register is being emptied by an agent while another buffer register is being filled from the memory interleaves.

In accordance with yet another aspect of the present invention, a multiple processor architecture comprises two system buses with two processors coupled to each of the system buses. At least two memory interleaves are provided with each memory interleave having two ports. A first one of the two ports of each memory interleave is coupled to a first one of the two system buses and a second one of the two ports of each memory interleave is coupled to a second one of the two system buses. Two I/O buses couple agents resident on the two I/O buses to one another, to the processors, and to the memory interleaves. I/O bus interface means couple the two I/O buses to the two system buses with control of the two system buses and the two I/O buses being independently arbitrated. The I/O bus interface means comprises buffering means for latching data to be written from the agents to the memory interleaves and for read-ahead prefetching data to be read by the agents from the memory interleaves.

The buffering means comprises at least one buffer register for each I/O bus with the buffer registers being sized to receive one line of data from the memory interleaves. The I/O bus interface means includes control means for selectively prefetching from one line of data up to the number of lines of data corresponding to the number of buffer registers included within an I/O bus interface means for each I/O bus. The buffering means may comprise at least two buffer registers for each I/O bus with the buffer registers being sized to receive one line of data from the memory interleaves, a full one of the buffer registers can be emptied by writing data packed therein to the memory interleaves while an empty one of the buffer registers can be packed with data to be written to the memory interleaves by an agent. Preferably, the buffering means comprises from four to eight buffer registers.

In accordance with still another aspect of the present invention, a method of interconnecting multiple processors comprises the steps of: interconnecting first and second processors to a first system bus; interconnecting third and fourth processors to a second system bus; interconnecting at least two memory interleaves by means of first and second ports on the memory interleaves to the first and second system buses; interfacing a first I/O bus to the first and second system buses by means of first I/O bus interface means; coupling first agents to the first I/O bus such that the first I/O bus can connect the first agents to one another, to the processors, and to the memory interleaves; interfacing a second I/O bus by means of second I/O bus interface means to the first and second system buses; coupling second agents to the second I/O bus such that the second I/O bus can connect the second agents to one another, to the processors, and to the memory interleaves; independently arbitrating access to the first and second system buses and the first and second I/O buses; packing data to be written into the memory interleaves from agents coupled to the first and second I/O buses, the data being packed into the first and second I/O bus interface means; writing packed data into the memory interleaves; prefetching data to be read from the memory interleaves to agents coupled to the first and second I/O buses, the data being prefetched into the first and second I/O bus interface means; and, transferring prefetched data read from the memory interleaves to the agents. In accordance with the broadest method aspects of the present invention, the method may comprise interfacing only a first I/O bus and associated agents to the first and second system buses.

In the method of interconnecting multiple processors preferably a line of data stored in the memory interleaves comprises x bytes of data, data to be written from an agent to the memory interleaves comprises at least one line of data and the step of packing data comprises packing a line of data into a line buffer before writing the packed data to the memory interleaves. The step of packing data preferably further comprises providing multiple line buffers for packing multiple lines of data to be written to the memory interleaves; continuing to pack data into the multiple line buffers; and, rotating the multiple line buffers to make each of the multiple line buffers available for new data whenever emptied by writing data packed therein to the memory interleaves.

In the method of interconnecting multiple processors preferably a line of data stored in the memory interleaves comprises x bytes of data and the step of prefetching data to be read from the memory interleaves to agents coupled to the first and second I/O buses comprises prefetching at least one line of data into a line buffer before transferring the prefetched data to an agent. The step of prefetching data to be read from the memory interleaves to agents coupled to the first and second I/O buses preferably further comprises: providing multiple line buffers for receiving multiple lines of prefetched data to be read from the memory interleaves; selectively prefetching a number of data lines corresponding to the priority level of an agent reading data from the memory interleaves; and, transferring data read by the agent from the multiple line buffers.

It is thus an object of the present invention to provide improved methods and apparatus for configuring the architecture of a multiple processor computer system; to provide improved methods and apparatus for configuring the architecture of a multiple processor computer system to include at least two independently arbitrated system or memory buses with at least two processors coupled to each of the system buses, and at least one independently arbitrated I/O bus which is coupled to the system buses to provide multiple expansion slots hosting up to a corresponding number of I/O bus agents for the systems at the cost of a single system bus load; and, to provide improved methods and apparatus for configuring the architecture of a multiple processor computer system to include at least two independently arbitrated system or memory buses with at least two processors coupled to each of the system buses, and at least two independently arbitrated I/O buses which are coupled to the system buses to provide multiple expansion slots hosting up to a corresponding number of I/O bus agents for the systems at the cost of a single system bus load with memory data buffering being provided between the I/O buses and the I/O bus agents.

Other objects and advantages of the invention will be apparent from the following description, the accompanying drawings and the appended claims.

DETAILED DESCRIPTION OF THE INVENTION

Reference will now be made to the drawing figures wherein FIGS. 1A and 1B form a block diagram of a multiple processor system 100 in accordance with the present invention including four processors 102, 104, 106, 108, two system buses 110, 112 and two subsystem I/O buses 114, 116. The processors 102 and 104 are coupled to the system bus 110 and the processors 106 and 108 are coupled to the system bus 112. In the preferred embodiment, the system buses 110, 112 are non-multiplexed, tenured, burst buses. Tenured implies a master owns the bus for the duration of a data transfer and non-multiplexed implies separate physical address and data paths. Burst implies one address is put on a system bus and then groups of data bits, for example either 32 or 64 bits of data in the preferred embodiment, are transferred on each system bus clock until an entire memory data line is transferred.

The processors 102–108 are coupled to four independent, dual ported memory interleaves 118, 120, 122 and 124 via the system buses 110, 112 which may also be denominated memory buses. Interleaving is a memory partitioning scheme which interleaves linearly addressed memory lines across multiple memory banks. For example, in the four-way interleave shown in FIGS. 1A and 1B, line address 0 is mapped to bank 0 of memory interleave 118; line address 1 is mapped to bank 0 of memory interleave 120; line address 2 is mapped to bank 0 of memory interleave 122; line address 3 is mapped to bank 0 of memory interleave 124; line address 4 is mapped to bank 0 of memory interleave 118; and so forth. While four memory interleaves are shown in the multiple processor system 100 of FIGS. 1A and 1B, any reasonable number of interleaves may be used in the disclosed architectures with from one to four being typical.

Also coupled to the system buses 110, 112 are a dual ported interrupt controller 126 and I/O bus interface means comprising dual ported I/O bus interface circuits 134 and 136 with the I/O bus interface circuit 134 interfacing the I/O bus 114 to the system buses 110, 112 and the I/O bus interface circuit 136 interfacing the I/O bus 116 to the system buses 110, 112. Operation of the interrupt controller 126 and the I/O bus interface circuits 134, 136 will be described hereinafter.

The I/O bus 114 is designated as the primary I/O bus and couples a video subsystem 138 to the multiple processor system 100. The video subsystem 138 is also directly coupled to the processors 102–108 via a video bus 140. A peripheral bus 142 is coupled to the I/O bus 114 and connects the multiple processor system 100 to standard peripheral devices 144, ROM/RAM 146, a diagnostic processor 148 and a configuration and test (CAT) controller 150 which also interfaces to the multiple processor system 100 via a CAT bus 152. A direct memory access (DMA) controller 154 which houses a central arbitration control point (CACP) for the I/O bus 114 is also coupled to the I/O bus 114 for direct memory access operations.

A number of expansion slots 156 are provided on the I/O bus 114 for interfacing a corresponding number of agents to the multiple processor system 100. For example, a preferred I/O bus for the multiple processor system 100 is commercially available from the IBM corporation under the name Micro Channel, which provides 8 expansion slots. Thus, by utilizing the architecture of the present invention, a number of expansion slots corresponding to the I/O bus used in the multiple processor system 100 can be provided for a single load on the system bus, i.e. the system buses 110, 112. If the noted IBM I/O bus is used, 8 expansion slots are provided while other I/O buses will provide alternate numbers of expansion slots depending upon the selected I/O bus. The I/O bus 116 in the illustrated multiple processor system 100 provides an additional number of expansion slots 158 and also includes a DMA controller 160 with a CACP coupled to the I/O bus 116.

While four processors 102–108 are shown in the illustrative embodiment, it is apparent that any reasonable number of processors can be used in accordance with the present invention dependent upon a given application and the required processing power. In addition, dual processors can be provided in the place of the single processors 102-108. The processors 102-108 preferably are 80486 processors which are commercially available from the Intel Corporation. In any event, the processors 102-108 comprise a processing unit P and a copy-back cache memory C which are interconnected by a processor bus PB as shown by the expansion of the processor 102 in FIG. 1A.

A copy-back cache keeps both read hits and write hits off the system bus or memory bus. A write hit modifies its internal cache entry and marks the line as modified in the cache memory. A global cache consistency protocol ensures that only one copy-back cache memory is allowed to own and freely modify a line without informing the system. Since the owner cache may have the only valid copy of a line of data, that cache must update the system memory when it replaces a modified line of data. The owner cache is also responsible for supplying the line contents in response to a request for the line from any other system device.

Figure 1A:
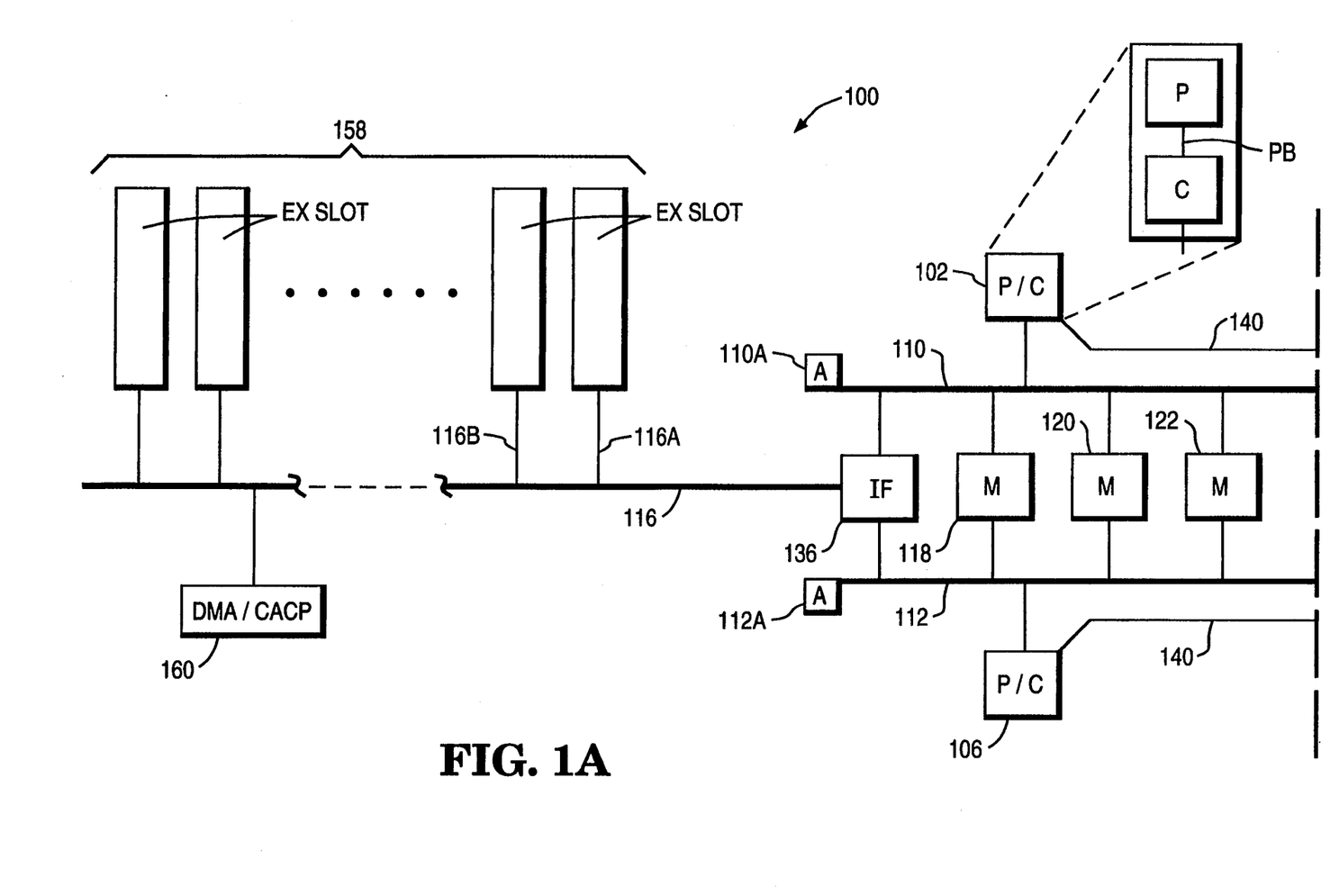
FIGS. 1A and 1B when joined together form a block diagram of an illustrative embodiment of the multiple processor system of the present invention including four processors, two system buses and two subsystem I/O buses.
Figure 1B:
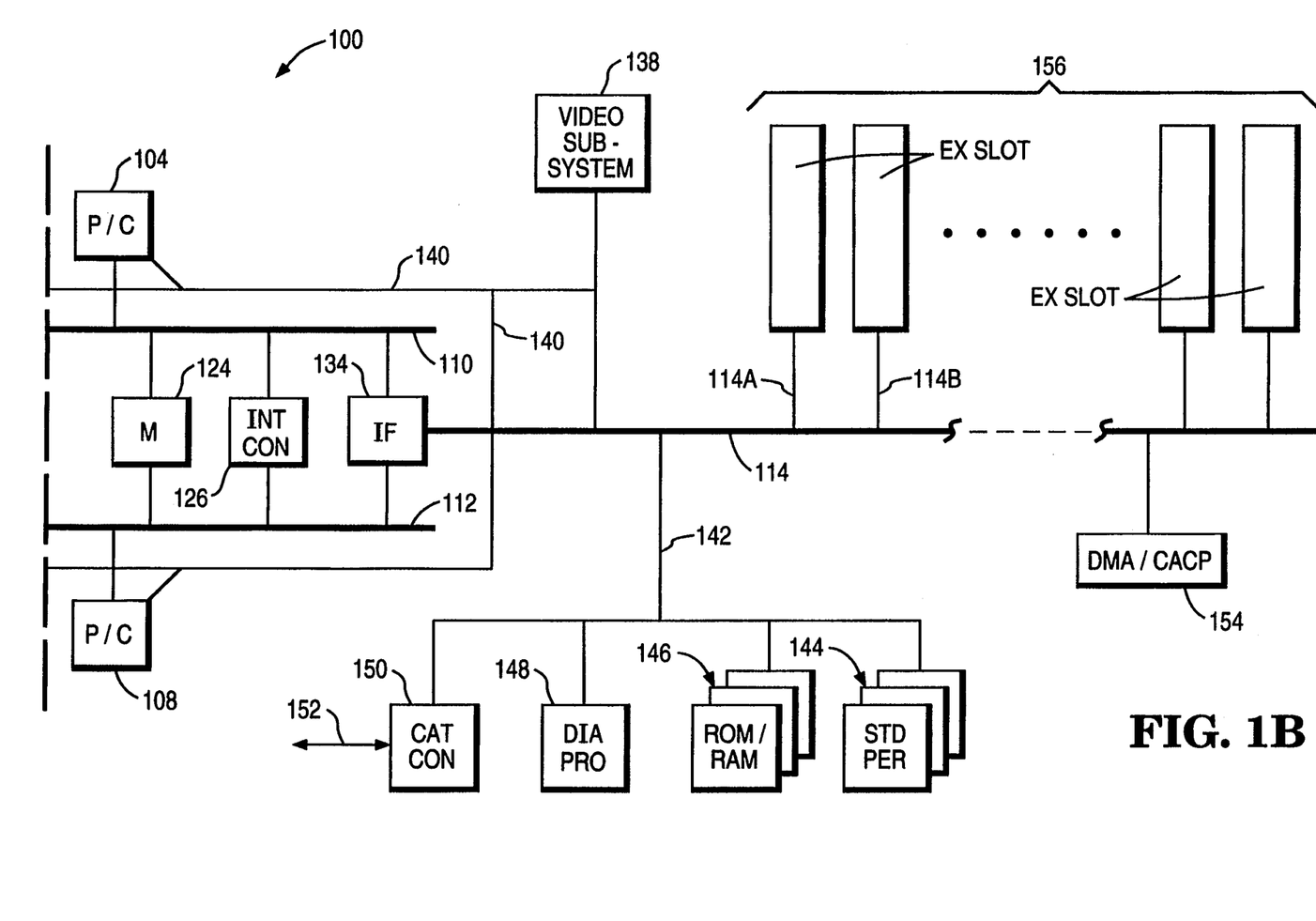
Figure 2:
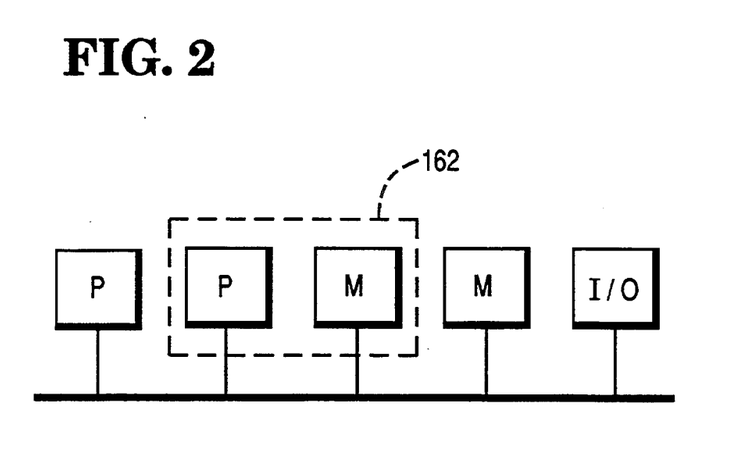
FIGS. 2 and 3 are block diagrams of down-scaled configurations of the multiple processor system of FIGS. 1A and 1B.
Figure 3:
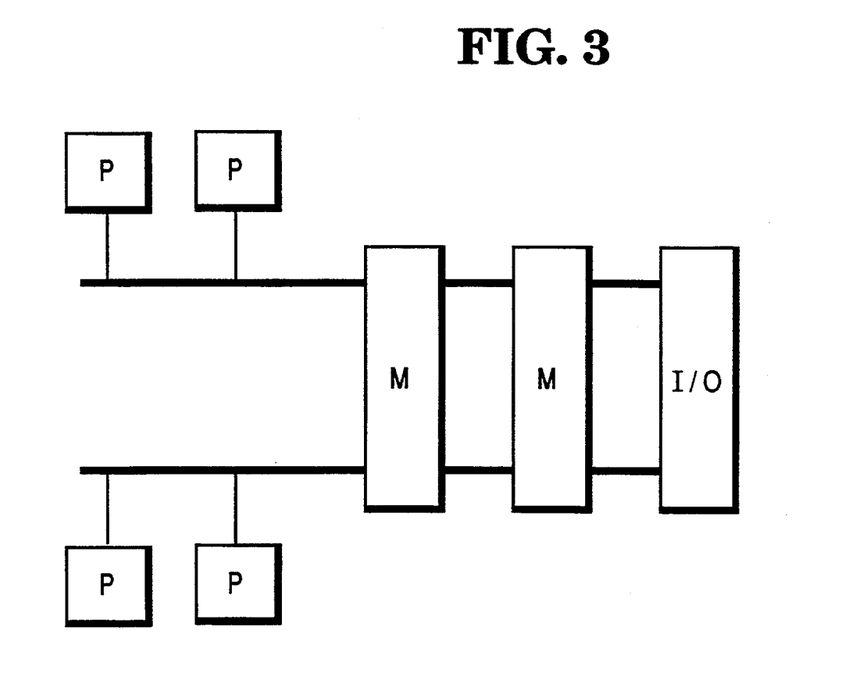
Figure 4:
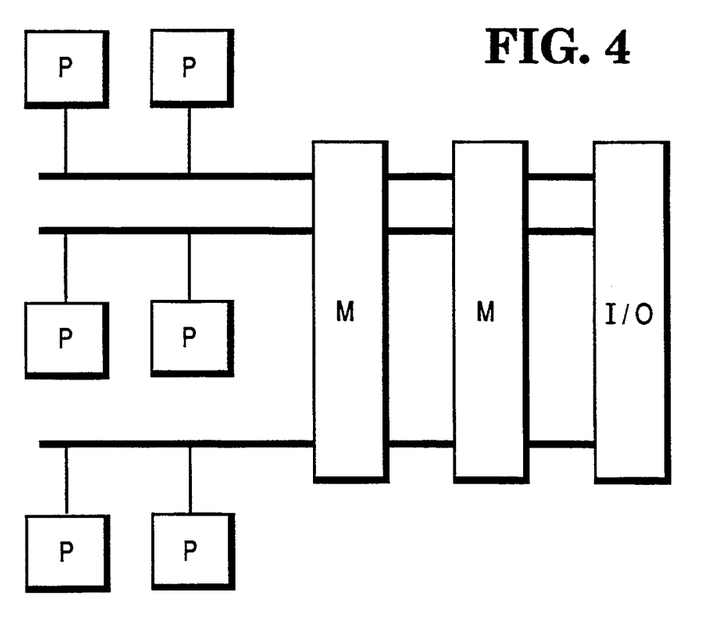
FIGS. 4 and 5 are block diagrams of up-scaled configurations of the multiple processor system of FIGS. 1A and 1B.
Figure 5:
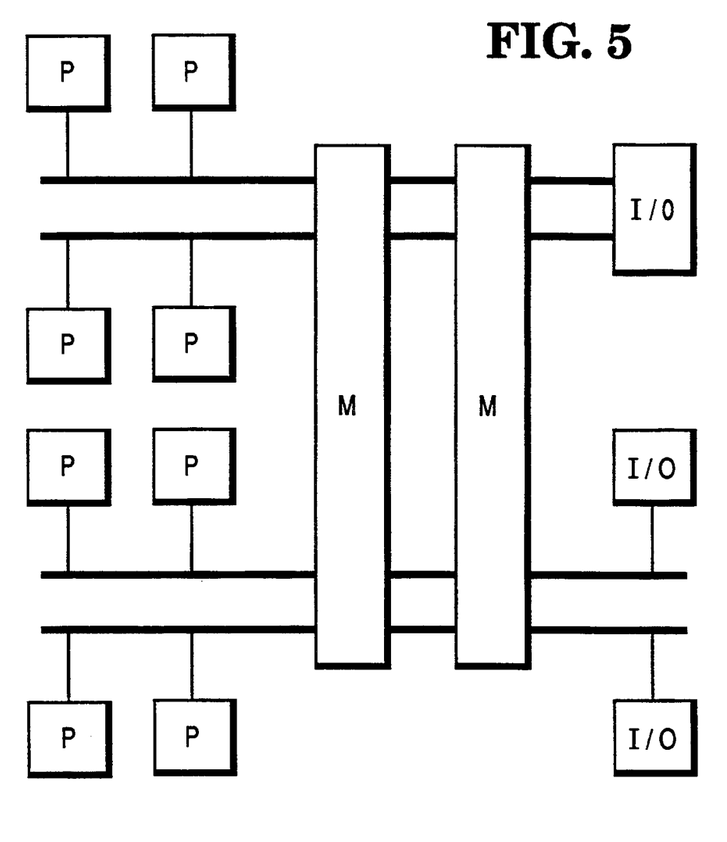

The configuration of FIGS. 1A and 1B can be up-scaled, for example to the configurations of FIGS. 4 and 5 or down-scaled, for example to the configurations of FIGS. 2 and 3, with the ultimate down-scaling being to a system 162 having one bus with one processor and one ported memory as shown in the dotted line box of FIG. 2. Configurations range from this simplest case of one bus and one ported memory with one or more processors to N buses with N ported memories with one or more processors connected to each of the N buses. In particular, FIGS. 2-5 show a unibus system, a dual bus system, a tribus system and a quadbus system, respectively. Note that in general the I/O buses can either be ported across all N system buses or else ported across some number of the system buses less than N. In the latter case, the N ported memory would implement intelligent decoder and bus-to-bus bridge services in hardware to ensure all processors have an identical view of I/O resources.

An important feature of the architectures of the present invention is that the system buses 110, 112 and the I/O buses 114, 116 are independently arbitrated system resources, i.e. the multiple processor system 100 includes a decoupled bus structure. Independent arbitration is performed for all system and I/O buses for all system configurations. For example, in the illustrated embodiment of FIGS. 1A and 1B, the system buses 110, 112 each include their own arbitration circuitry 110A, 112A as a part of the bus system, with arbitration being performed in accordance with well known arbitration strategies based, for example, on assigned priority levels. Similarly, arbitration of the I/O buses 114, 116 is independently performed in accordance with well known arbitration strategies.

Thus, when an agent arbitrates to become owner of the I/O bus to which it is connected, the agent wins ownership of that I/O bus only. Only when an I/O bus interface circuit decodes that an agent wants to access the main memory does it arbitrate for a system bus and run a memory cycle. An agent can therefore communicate with other agents on its I/O bus while the processors of a multiple processor system still have complete access to the memory interleaves over the system bus, i.e. the system buses 110, 112 in the multiple processor system 100 of FIGS. 1A and 1B.

Figure 6:
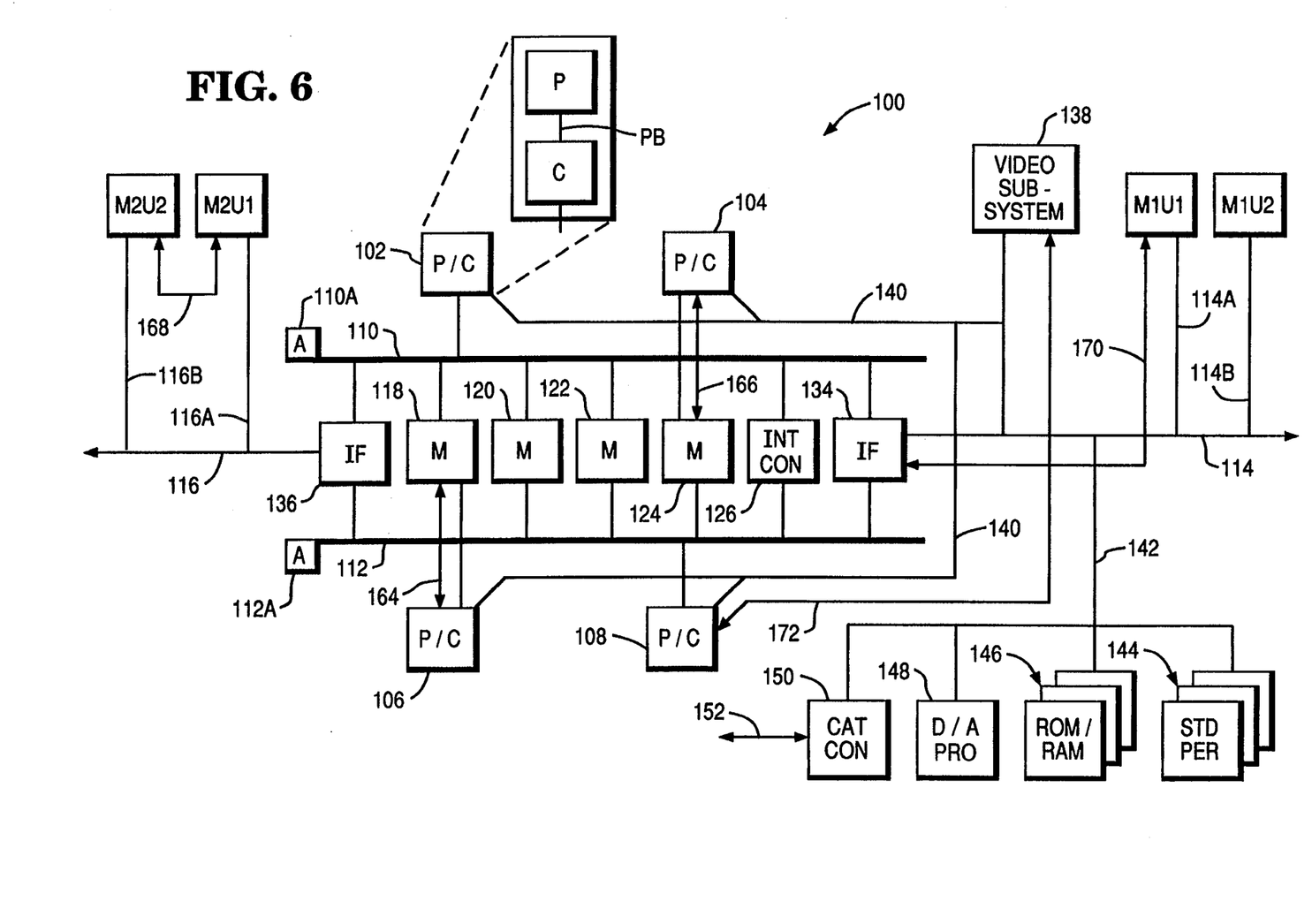
FIG. 6 is a block diagram of the multiple processor system of FIGS. 1A and 1B illustrating operations which can be performed simultaneously on that system.

The block diagram of FIG. 6 illustrates how the decoupled bus structure of the disclosed architectures facilitates operations within the multiple processor system 100 by means of the many possible concurrent operations which can be performed. For example, as shown in FIG. 6, the processor 106 is coupled to the memory interleave 118 via the system bus 112 through a path 164 while the processor 104 is coupled to the memory interleave 124 via the system bus 110 through a path 166.

In addition, the following system operations are also taking place concurrently with the operations of the processors 106, 104: two I/O bus agents M2U1 and M2U2 are coupled to one another via the I/O bus 116 through a path 168; a bus agent M1U1 is coupled to the I/O bus interface circuit 134 via the I/O bus 114 through a path 170, perhaps awaiting availability of one of the system buses 110, 112 for a memory operation; and, the processor 108 is coupled to the video subsystem 138 via the video bus 140 through a path 172. Of course, the paths 164-172 are merely representative of the numerous concurrent paths through the multiple processor system 100 illustrative of the present invention. It is apparent that the decoupled bus structure together with the use of memory interleaves and cache memories minimizes use of the system bus and memory of systems configured in accordance with the disclosed architectures in addition to enabling concurrent operation of the system processors and agents resident on the I/O buses.

An additional feature of the multiple processor systems of the present application is that they enable agents on the I/O buses to run at substantially full speed when moving data to or from the main memory, i.e. the memory interleaves 118-124 of FIGS. 1A and 1B. To that end, the I/O bus interface circuits 134, 136 are arranged to supply data read from main memory as fast as an agent can receive it, and to receive data written to the main memory as fast as an agent can supply it. This not only improves each agent's performance, but also lowers each agent's utilization of I/O bus bandwidth. Lower utilization of I/O bus bandwidth allows more agents to be serviced by an I/O bus and reduces processor latency when accessing I/O bus resources, i.e. agents on the I/O buses.

Data exchanges between agents on an I/O bus and the main memory or memory interleaves of multiple processor systems of the present application will now be described with reference to FIG. 7 which is a schematic block diagram of the I/O bus interface circuit 134 of FIG. 1B. Since the I/O bus interface circuits 134, 136 are very similar to one another and can be substantially identical, only the I/O bus interface circuit 134 will be described herein. Maximum efficiency is achieved when the I/O bus interface circuits 134, 136 use the system bus's full line (16 or 32 byte) burst read and write cycles. These cycles optimally exploit the interleaved memory architecture, which in turn is optimized for transactions between the memory interleaves and processor copy-back caches.

For the I/O bus interface circuits 134, 136 to accommodate the system bus's full line burst read and write cycles, data is buffered in the I/O bus interface circuits 134, 136. For writes, a number of writes by an I/O bus agent are accumulated in buffering means comprising at least one buffer register, and for reads, at least one line of data from the system memory is read into the same buffering means. The read and write buffering operations exploit the fact that most I/O bus agents or masters are "block oriented", i.e. data moves are typically large, relatively well organized and progress in linearly ascending address order. This is particularly useful for the I/O bus's streaming mode protocols, which are by definition homogeneous, i.e. a single data stream is either all reads or all writes, and constrained to linearly ascending address order.

Figure 7:
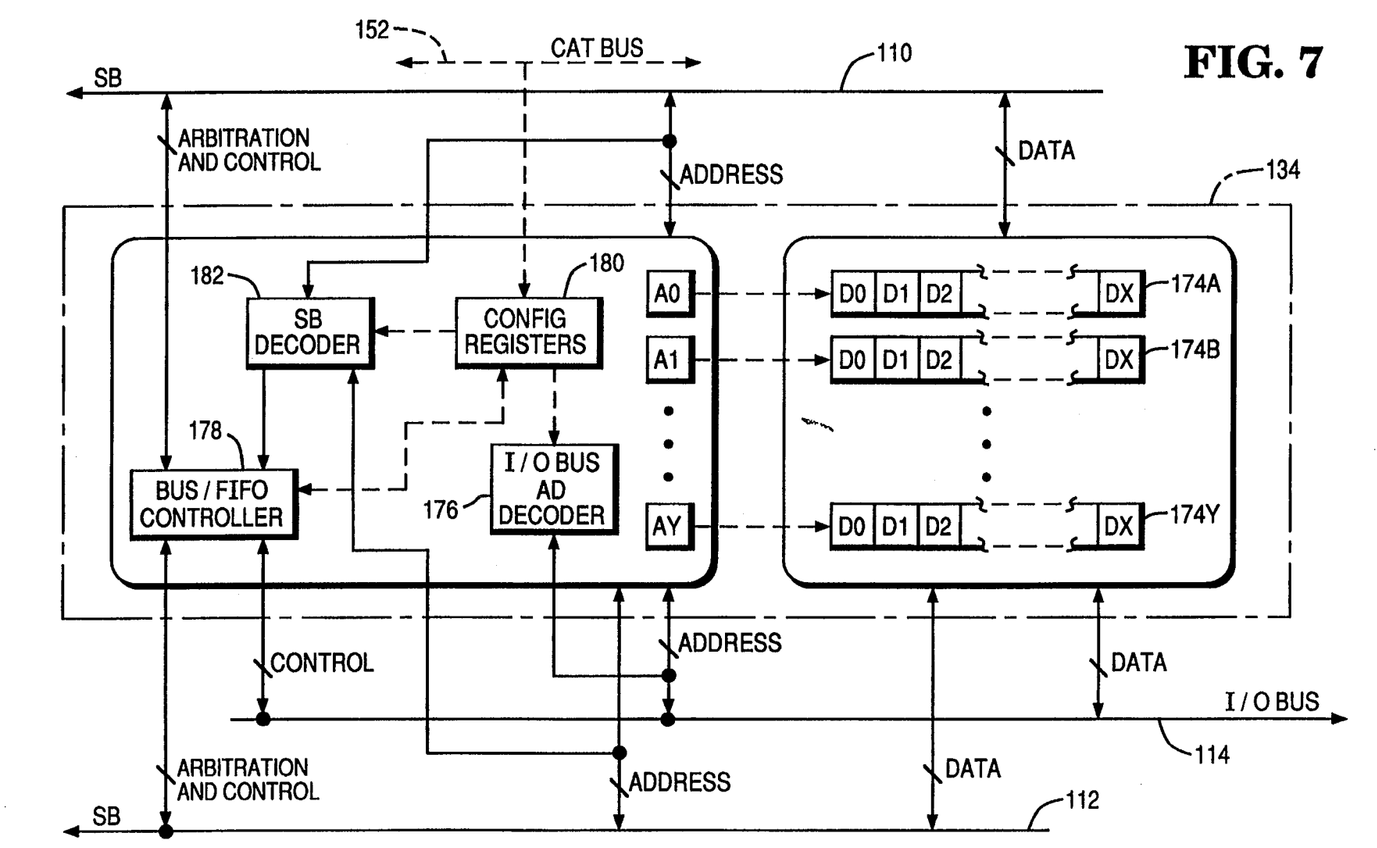
FIG. 7 is a schematic block diagram of an I/O bus interface circuit of the multiple processor system of FIGS. 1A and 1B.
Figure 8:
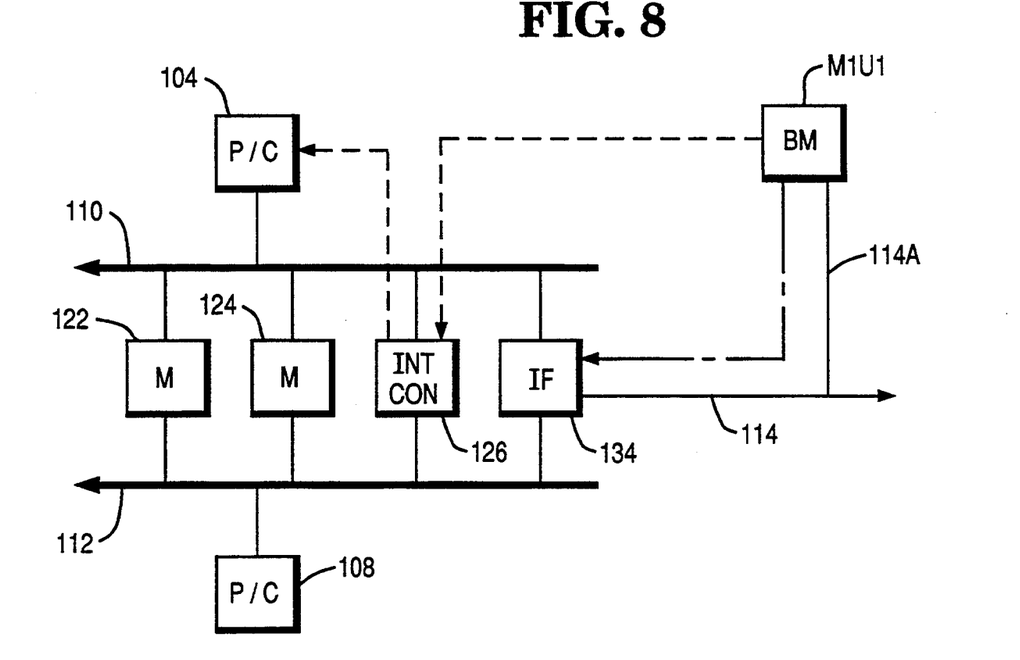
FIG. 8 shows a portion of the multiple processor system of FIGS. 1A and 1B illustrating tightly coupled interrupt paths and a write to an interface circuit as an initial step in a write to main memory by an I/O bus master.
Figure 9:
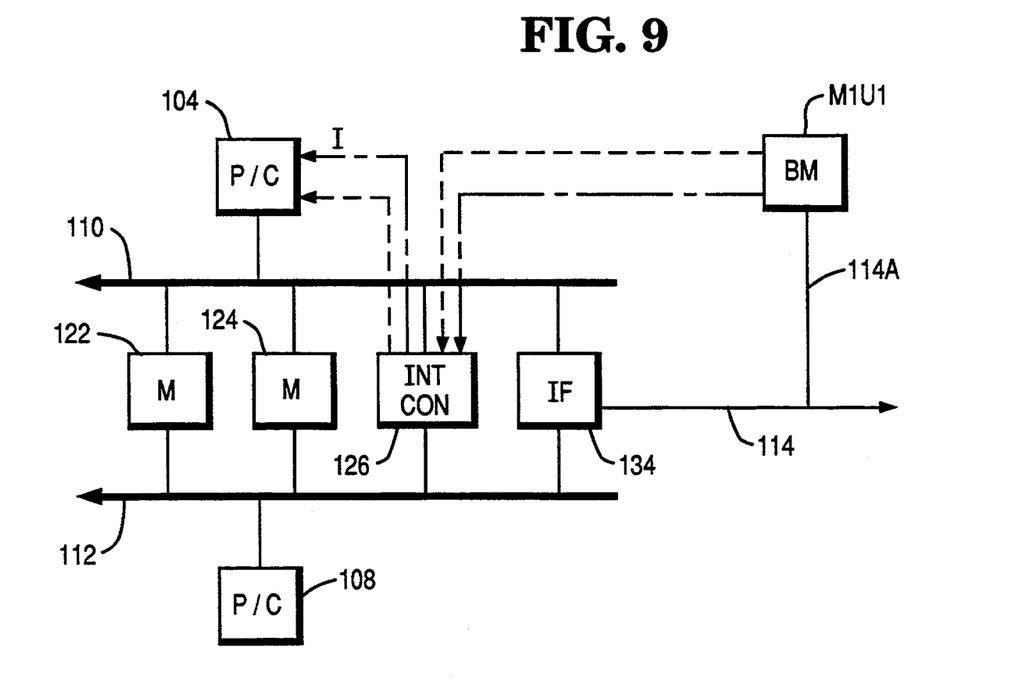
FIG. 9 illustrates passage of an interrupt from the I/O bus master of FIG. 8 to a processor of the multiple processor system of FIGS. 1A and 1B via an I/O bus interface circuit.
Figure 10:
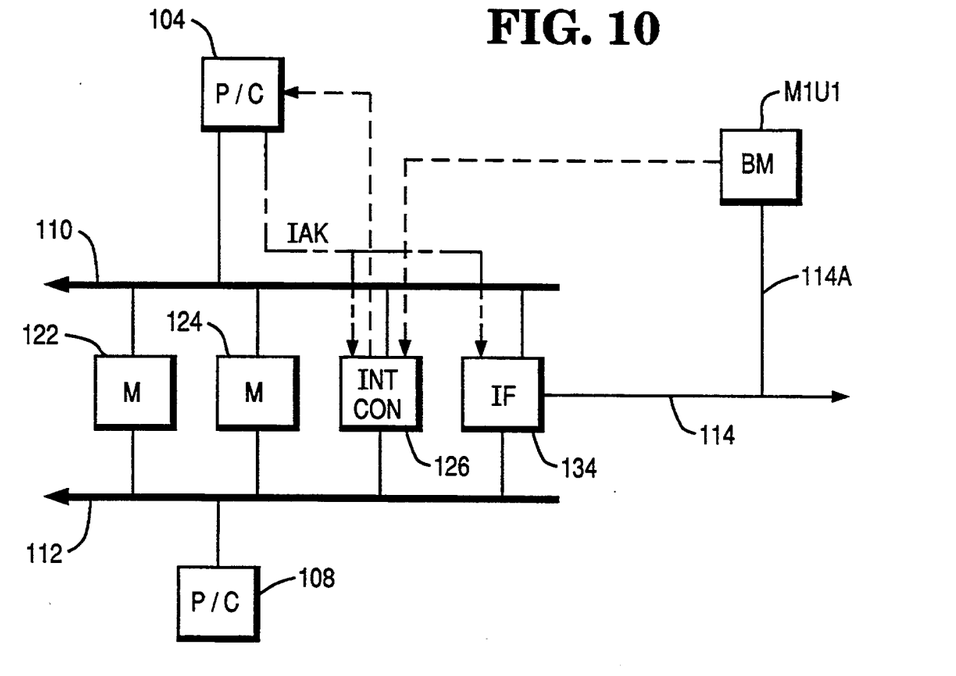
FIG. 10 illustrates generation of an interrupt acknowledge cycle by a processor of the multiple processor system of FIGS. 1A and 1B.

In the embodiment of the I/O bus interface circuit 134 shown in FIG. 7, the buffer registers comprise first-in-first-out (FIFO) registers 174A–174Y. Each of the FIFO registers 174A–174Y comprises $X+1$ data words, $D0-DX$, and store an entire memory line of data, either 128 or 256 bits. For example, X can be equal to 7 such that 8 data words of 16 bits or 32 bits each are stored in each FIFO register 174A–174Y for a 128 or 256 bit line of data, respectively.

When an I/O bus address decoder 176 of the I/O bus interface circuit 134 decodes a bus master write to main memory, the write is not immediately propagated to the system bus, i.e. one of the system buses 110, 112. Rather the data is latched in the I/O bus interface circuit 134, more particularly into the FIFO registers 174A–174Y and the bus master cycle terminated immediately. Thus, the I/O bus interface circuit 134 accepts the data as fast as the agent which is the current bus master supplies it. Now assume the master continues running writes in linear address order, or else initiates a stream. The I/O bus interface circuit 134 continues to latch data without delay until an entire line, 16 or 32 bytes depending on the system configuration, is captured or "packed" in one of the FIFO registers 174A–174Y or "line buffers".

Only then does a bus/FIFO controller 178 of the I/O bus interface circuit 134 arbitrate for the system bus, i.e. one of the system buses 110, 112 and propagate the data to the main memory or memory interleaves 118–124 as a single write line burst. Meanwhile, another FIFO register or line buffer in the I/O interface circuit 134 continues to accept and pack data from the master without interruption.

In a preferred embodiment of the multiple processor system 100 of FIGS. 1A and 1B, the I/O bus interface circuits 134, 136 have either 4 or 8 FIFO registers or line buffers, depending on the system configuration, such that Y would be equal to 3 or 7, of course any reasonable number of FIFO registers can be used as required for a given application. In this way, the FIFO registers 174A–174Y are continuously filled by the master, emptied to the main memory via the system bus, and then made available again for new data. The line buffers or FIFO registers 174A–174Y continue to roll over indefinitely causing no delays to the master, unless the system bus falls sufficiently behind so that all the buffers fill before one can be emptied. In this case the master is stalled until a register or line buffer becomes available.

The term "packing" implies that multiple bus master cycles are assembled into a single system bus burst write. For example, 8 cycles of a 32-bit master will be packed into a single system bus write for a line size of 32 bytes. Preferably, the line size matches that of the system cache memories such that there will be at most one cache coherency operation associated with the 8 bus master cycles. In the case of a 16-bit master, 16 of its cycles will be packed into a single system bus write.

When the I/O bus address decoder 176 of the I/O bus interface circuit 134 decodes a bus master read from main memory, it stalls the master and immediately arbitrates for the system bus. Once one of the system buses 110, 112 is won, the I/O bus interface circuit 134 fetches an entire data line from main memory in a single burst read and stores it locally in a line buffer or one of the FIFO registers 174A–174Y. The data requested by the master is driven onto the I/O bus 114 and the master is released. If the master continues reading in linear address order, or else initiates a stream, the I/O bus interface circuit 134 then supplies data out of its line buffer with no delays.

Anticipating that the master will continue to request data in linearly ascending order, the I/O bus interface circuit 134 may initiate additional system bus burst reads, i.e. read-aheads or prefetches, that fill additional line buffers or ones of the FIFO registers 174A–174Y. Thus, the I/O bus interface circuit 134 attempts to anticipate the master and have the desired data ready and waiting locally when the master requests it. The I/O bus interface circuit 134 can be selectively configured to prefetch 1 line of data or up to the number of lines of data corresponding to the number of line buffers or FIFO registers 174A–174Y from the main memory, for example, 1, 2, 4 or 8 lines of data may be prefetched based on the arbitration level of the bus agent or master performing the memory read. The number of lines which are prefetched are correlated to the bus agents such that the number of lines prefetched corresponds to the number of lines which are typically read by the agent.

Unlike the write operation of the I/O bus interface circuit 134, the first bus master read is stalled while the I/O bus interface circuit 134 fetches the first line of data from main memory. However, in the case of a 32-bit master and a 32 byte line size, the next 7 cycles are serviced from line buffer or one of the FIFO registers 174A–174Y without delay. Accordingly, the time losses associated with stalled reads are efficiently amortized over a much larger number of non-delayed reads such that average read latency is low.

A method and apparatus for operating the disclosed multiple processor architectures in a manner to ensure that only up-to-date data is used will now be described. The high performance multiple processor architectures of the present application include storage of data to be written to the main memory in the I/O bus interface circuits 134, 136 as described. This storage of write data in the I/O bus interface circuits 134, 136 ensures that data is accepted as fast as the agent which is the current bus master can supply it; however, until it is written to main memory, the data contained in the main memory is not up-to-date. Copy-back cache memories also may contain the only accurate copies of data rather than the main memory. In addition, the interrupt controller 126 of the disclosed multiple processor systems is tightly coupled, i.e. the interrupt controller 126 can be quickly accessed by agents resident on the I/O buses 114, 116 and the processors 102–108 resident on the system buses 110, 112 without having to gain access to or own an I/O bus or a system bus.

Accordingly, in the high performance architectures of the present application, one must ensure that data written by a bus agent to main memory has reached main memory and is not still propagating through the FIFO registers 174A–174Y of the I/O bus interface circuits 134, 136 before an interrupt is processed. Further, one must ensure that any cached copies of target memory locations are either invalidated or updated before an interrupt is serviced. Otherwise, an interrupt service routine (ISR) may be invoked in response to an interrupt acknowledge cycle and process data from the main memory which is not up-to-date.

Reference will now be made to FIGS. 8–11 which each show a portion of the multiple processor system 100 of FIGS. 1A and 1B to illustrate operation of the multiple processor system 100 in a manner to ensure that only up-to-date data is used. Here again, because of the similarity of I/O bus interfaces 134 and 136, only I/O bus interface circuit 134 will be described as was done with respect to FIG. 7. When an I/O bus master M1U1 writes to main memory, the FIFO registers 174A–174Y of the I/O bus interface circuit 134 latch the address/data and immediately release the master M1U1, i.e. the master M1U1 does not have to wait for the data to reach main memory before its cycle is terminated, see FIG. 8.

As soon as the write cycle of the bus master M1U1 is terminated, from the perspective of the master M1U1 the write is complete and it generates an interrupt signal indicating completion of the write cycle to an associated processor shown in FIGS. 8–11 to be the processor 104. Since the interrupt controller 126 resides on the system bus and can be accessed concurrently with I/O bus master activity, the interrupt (I) is passed to the processor 104, see FIG. 9, which generates an interrupt acknowledge (IAK) cycle on the system bus 110 to fetch an interrupt vector from the interrupt controller 126 such that the processor 104 can perform a corresponding interrupt service routine (ISR), see FIG. 10. In accordance with this aspect of the operation of the disclosed multiple processor systems, servicing of the IAK cycle is deferred to ensure that only up-to-date data is used by the systems.

Figure 11:
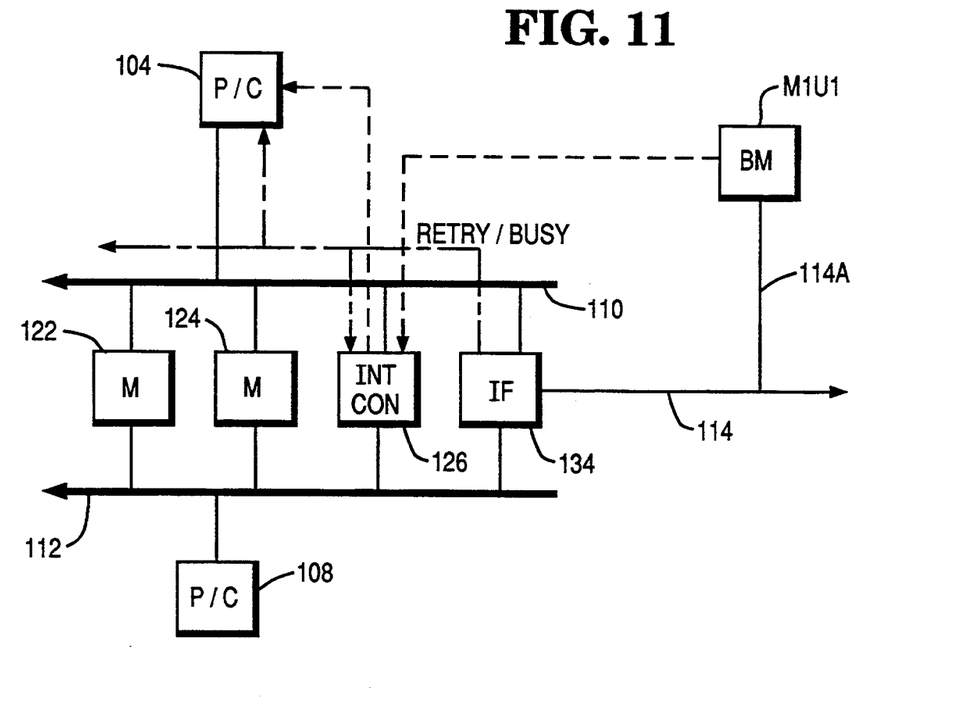
FIG. 11 illustrates generation of a retry/busy signal by an I/O bus interface circuit in response to an interrupt acknowledge cycle.

When the processor 104 issues an IAK cycle on the system bus 110 in response to an interrupt request from the bus master M1U1, if the system bus 110 is not the current owner of the I/O bus 114, i.e. the I/O bus 114 is owned by some other bus master and this data may be contained in the FIFO registers 174A–174Y, the I/O bus interface circuit 134 issues a retry signal to the processor 104 for the IAK cycle as if the I/O bus interface circuit 134 was the selected slave rather than the interrupt controller 126 and raises a busy signal, see FIG. 11. The interrupt controller 126 monitors the system bus to detect the retry signal issued by the I/O bus interface circuit 134, and waits a period of time corresponding to a predetermined number of clock cycles before responding as slave to the IAK cycle and returning an appropriate interrupt vector. If the interrupt controller 126 does not see a retry signal during the wait time period, the I/O bus interface circuit 134 is not going to issue a retry signal and accordingly, the interrupt controller 126 supplies the appropriate interrupt vector and terminates the IAK cycle normally.

The retry signal causes the processor 104 to get off the system bus, its IAK cycle still pending. The system bus arbitration circuitry 110A, 112A shown in FIG. 1A will not allow the processor 104 onto the system bus 114 again until the I/O bus interface circuit 134 removes its busy signal. Eventually the system bus 110 acquires ownership of the I/O bus 114; however, the I/O bus interface circuit 134 will not remove its busy signal until all bus master to main memory writes still pending in its FIFO registers 174A–174Y from the previous owner are completed and all associated coherency operations are complete. The I/O bus interface circuit 134 monitors the system bus to determine when coherency operations are complete. Until the I/O bus interface circuit 134 removes its busy signal it will continue to issue retry signals in response to any attempt by any other processor to access the I/O bus or to do an IAK cycle.

When the I/O bus interface circuit 134 finally removes its busy signal, the arbitration circuitry 110A or 112A, shown in FIG. 1A, enables the processor 104 that originally attempted the IAK cycle to reissue the cycle. This time, since the I/O bus interface circuit 134 is not busy it does not issue a retry signal, and the interrupt controller 126 supplies an interrupt vector and terminates the cycle. Although in this case the I/O bus interface circuit does not issue a retry signal, it does "lock" I/O bus ownership and will not surrender it to another master until the I/O bus interface circuit 134 detects that the interrupt controller 126 has successfully supplied an interrupt vector to the processor 104 and terminated the IAK cycle. This procedure protects against the possibility of another I/O bus agent gaining ownership of the I/O bus as master, issuing a memory write to the I/O bus interface circuit 134, and then issuing a higher priority interrupt before the IAK completes. If bus ownership by another master was allowed to occur, there is a possibility that the interrupt controller 126 would supply an interrupt vector for the higher priority interrupt, even though its associated data is still in the FIFO registers 174a–174Y of the I/O bus interface circuit 134. System performance can be enhanced and deadlocks can be avoided by handling non-IAK cycles to a busy I/O bus in a manner similar to the handling of IAK cycles as just described.

While all I/O bus interface circuits of a system, such as the I/O bus interface circuits 134, 136 of the multiple processor system 100, can be configured to retry processors issuing interrupt acknowledge (IAK) cycles when buffered data is resident in the interface circuits, such operation can only delay performance of the system. System delay results if all buffered data has been flushed to main memory before an IAK cycle was completed. Accordingly, it is preferred to provide the described IAK retry operation only for the I/O interface circuit 134 for the primary I/O bus 114. Flushing of data from any additional I/O buses, such as the I/O bus 116, is ensured by having the processor or processors of a system perform an I/O access to any additional I/O buses which, though slower than the IAK retry operation of the I/O bus interface circuit 134, ensures any resident data is flushed to main memory.

A method and apparatus for interfacing multiple decoupled I/O buses to a common system bus will now be described with reference to the preferred I/O bus, IBM's Micro Channel; however, it should be understood that this aspect of the present invention is generally applicable to whatever I/O bus may be selected for use in a given multiple processor system. The benefits of using multiple decoupled I/O buses, among others, include greater configurability for a multiple processor system since each added I/O bus will support a corresponding number of expansion slots, for example 8 or 16 in the case of the preferred I/O buses. Since the I/O buses are independent and buffer read/write main memory data, the achievable I/O data rate grows linearly with the addition of each I/O bus. Additional I/O buses can be added as I/O bandwidth and capacity requirements grow. Also, since each additional I/O bus is independently buffered, there are no inherent electrical loading issues associated with adding I/O buses apart from 1 extra load on the system bus. For example, with the use of a Micro Channel I/O bus, 1 extra system bus load provides capacity for 8 additional I/O agents. In the multiple processor systems disclosed in the present application, it is noted that each I/O bus has its own I/O bus interface circuit and DMA with included CACP.

In the multiple processor systems of the present application, two decoding arrangements are utilized to accommodate multiple I/0 buses: a programmable decoder that partitions available memory and I/O space among I/O buses; and, an address translator that keeps hardware, such as off-the-shelf third party agents as well as the DMA/CACP, on each I/O bus from having to comprehend the existence of more than one I/O bus.

Each I/O bus interface circuit for the I/O buses, such as the I/O bus interface circuit 134 illustrated in FIG. 7, includes a set of I/O bus configuration registers 180. Some of the I/O bus configuration registers 180 define the memory and I/O addresses to which the I/O bus will respond. During system configuration, the corresponding ones of the configuration registers 180 of the I/O bus interface circuit 134 associated with each I/O bus are loaded via the CAT bus with the specific address ranges for the corresponding I/O bus. In this way, available memory and I/O space is partitioned among the multiple I/O buses. Specific address registers provided within the configuration registers 180 include: a Top/Bottom of I/O bus Memory register, TOM/BOM, to specify the range of memory addresses allocated to a particular I/O bus; a Top/Bottom of I/O addresses register, TIO/BIO, to specify the range of I/O addresses allocated to a particular I/O bus; a ROM expansion register to specify which of the 8K wide expansion ROM slices in the 768K to 896K range are allocated to a particular I/O bus; and, an 8M–16M local bits register to specify which of the 1M slices in the 8M–16M range are allocated to a particular I/O bus to support 24-bit address bus agents.

There are certain fixed addresses associated with I/O bus hardware. In the IBM Micro Channel hardware all of these fixed addresses reside in the lowest 512 byte block of I/O space. For example, I/O ports 0100h–0107h are reserved for configuring agents. When an agent is put into setup mode, it responds to this range of I/O address space and this range only for configuration purposes. Since all agents use the same range of I/O address space, a system bus address decoder 182 is provided to distinguish agents on different I/O buses, yet at the same time ensure all agents on all I/O buses still see the same range of I/O address space. A programmable address translation arrangement is provided in the I/O bus interface circuit 134 by means of a dedicated translation register within the configuration registers 180. At the time of system configuration, the dedicated translation register in each I/O bus interface circuit 134 is loaded via the CAT bus with a base value used to decode or translate accesses to these fixed addresses.

For example, assume the I/O interface circuits 134, 136, which are respectively connected to I/O buses 114, 116, as shown in FIGS. 1A and 1B, have translation base values of 0000h and 0400h for their system bus address decoders. The system bus address decoder 182 of the I/O bus 114, as shown in FIG. 7, with a translation base value 0000h responds to the 512 byte block starting at 0000h. When a processor configures agents on this I/O bus, it does so through ports 0100h–0107h per I/O bus definition. To configure agents on the second I/O bus 116, it does so through ports 0500–0507h, i.e. same offset into the 512 byte block, but now relative to 0400h instead of 0000h. However, the system bus address decoder of the I/O bus interface circuit 136 of the second I/O bus 116 (this decoder is not shown, but it is substantially the same as system bus decoder 182 in FIG. 7) strips out the offset before propagating the cycle onto the second I/O bus 116 so that agents on the second I/O bus 116 still see configuration cycles at 0100h–0107h.

Having thus described the invention of the present application in detail and by reference to preferred embodiments thereof, it will be apparent that modifications and variations are possible without departing from the scope of the invention defined in the appended claims.

What is claimed is:

1. A multiple processor architecture comprising:
   at least two system buses;
   each of said at least two system buses having at least two processors associated therewith and coupled thereto;
   at least two independently accessible interleaved memories, each of said interleaved memories having at least two ports which are coupled to said at least two system buses;
   at least one I/O bus for coupling agents resident thereon to one another, to said processors, and to said at least two interleaved memories; and
   at least one I/O bus interface means having at least two ports for coupling said at least one I/O bus directly to said at least two system buses, said agents being coupled to said processors and to said interleaved memories via said I/O bus, said I/O interface means and said system buses wherein said system buses and said I/O bus each comprise arbitration means for independently arbitrating control of said system buses and said I/O bus, and said I/O bus interface means comprises buffering means for latching data to be written from said agents to said interleaved memories and for read-ahead prefetching data to be read by said agents from said interleaved memories.

2. A multiple processor architecture comprising:
   at least two system buses;
   each of said at least two system buses having at least two processors associated therewith and coupled thereto;
   at least two independently accessible interleaved memories, each of said interleaved memories having at least two ports which are coupled to said at least two system buses;
   at least two I/O buses for coupling agents resident on said at least two I/O buses to one another, to said processors, and to said at least two interleaved memories; and
   at least two I/O bus interface means having at least two ports for coupling said at least two I/O buses directly to said at least two system buses, said agents being coupled to said at least two processors and to said at least two interleaved memories via said I/O buses, said at least two I/O interface means and said at least two system buses wherein said at least two system buses and said at least two I/O buses each comprise arbitration means for independently arbitrating control of said at least two system buses and said at least two I/O buses, and said at least two I/O bus interface means each comprise buffering means for latching data to be written from said agents to said at least two interleaved memories and for read-ahead prefetching data to be read by said agents from said at least two interleaved memories.

3. A multiple processor architecture as claimed in claim 2 wherein said buffering means each comprises at least one buffer register sized to receive one line of data, said one line of data corresponding in size to an entire line of data of any one of said at least two interleaved memories.

4. A multiple processor architecture as claimed in claim 3 wherein said at least two I/O bus interface means include control means for selectively prefetching from one line of data up to a number of lines of data corresponding to the number of buffer registers included within one of said I/O bus interface means.

5. A multiple processor architecture as claimed in claim 2 wherein said buffering means each comprise at least two buffer registers sized to receive one line of data, said one line of data corresponding in size to an entire line of data of any one of said at least two interleaved memories whereby one buffer register can be packed by an agent while another buffer register can be emptied by writing data packed therein to said at least two interleaved memories.

6. A multiple processor architecture comprising:
at least two system buses;
each of said at least two system buses having at least two processors associated therewith and coupled thereto;
at least two independently accessible interleaved memories, each of said interleaved memories having a number of ports corresponding to the number of system buses for coupling said interleaved memories to said system buses;
at least two I/O buses for coupling agents resident on said at least two I/O buses to one another; and
at least two I/O bus interface means, each of said I/O bus interface means having a number of ports corresponding to the number of system buses for coupling said I/O buses directly to said system buses, said agents being coupled to said processors and to said interleaved memories via said I/O buses, said I/O interface means and said system buses wherein said system buses and said I/O buses each comprise arbitration means for independently arbitrating control of said system buses and said I/O buses, and each of said I/O bus interface means comprise buffering means for latching data to be written from said agents to said interleaved memories and for read-ahead prefetching data to be read by said agents from said interleaved memories.

7. A multiple processor architecture as claimed in claim 6 wherein said buffering means each comprise at least one buffer register sized to receive one line of data from said at least two interleaved memories, said one line of data corresponding in size to an entire line of data of any one of said at least two interleaved memories.

8. A multiple processor architecture as claimed in claim 7 wherein said at least two I/O bus interface means include control means for selectively prefetching from one line of data up to the number of buffer registers included within an I/O bus interface means.

9. A multiple processor architecture as claimed in claim 6 wherein said buffering means each comprise at least two buffer registers sized to receive one line of data, said line of data corresponding in size to an entire line of data of any one of said at least two interleaved memories whereby one buffer register can be packed by an agent while another buffer register can be emptied by writing data packed therein to said at least two interleaved memories.

10. A multiple processor architecture comprising:
two system buses;
each of said system buses having two processors associated therewith and coupled thereto;
at least two independently accessible interleaved memories, each having two ports, a first one of said two ports of each of said interleaved memories being coupled to a first one of said two system buses and a second one of said two ports of each of said interleaved memories being coupled to a second one of said two system buses;
two I/O buses for coupling agents resident on said two I/O buses to one another, to said processors, and to said interleaved memories; and
two ported I/O bus interface means for coupling said two I/O buses directly to said two system buses, said agents being coupled to said two processors and to said interleaved memories via said two I/O buses, said I/O interface means and said two system buses wherein said two system buses and said two I/O buses each comprise arbitration means for independently arbitrating control of said two system buses and said two I/O buses, and said I/O bus interface means comprises buffering means for latching data to be written from said agents to said interleaved memories and for read-ahead prefetching data to be read by said agents from said interleaved memories.

11. A multiple processor architecture as claimed in claim 10 wherein said buffering means comprises at least one buffer register for each I/O bus, said buffer registers being sized to receive one line of data from said at least two interleaved memories, said one line of data corresponding in size to an entire line of data of any one of said at least two interleaved memories.

12. A multiple processor architecture as claimed in claim 11 wherein said I/O bus interface means include control means for selectively prefetching from one line of data up to the number of lines of data corresponding to the number of buffer registers included within an I/O bus interface means for each I/O bus.

13. A multiple processor architecture as claimed in claim 10 wherein said buffering means comprises at least two buffer registers for each I/O bus, said buffer registers being sized to receive one line of data from said interleaved memories, said one line of data corresponding in size to an entire line of data of any one of said interleaved memories whereby a full one of said buffer registers can be emptied by writing data packed therein to said interleaved memories while an empty one of said buffer registers can be packed with data to be written to said interleaved memories by an agent.

14. A multiple processor architecture as claimed in claim 13 wherein said buffering means comprise from four to eight buffer registers for each I/O bus.

* * * * *